United States Patent [19]

Grabovac et al.

[11] Patent Number: 4,852,386
[45] Date of Patent: Aug. 1, 1989

[54] DISPOSABLE TORQUE SCREWDRIVER TESTER

[75] Inventors: Bosko Grabovac, Arcadia; Jadranka Kurtovic, Walnut, both of Calif.

[73] Assignee: Consolidated Devices Inc., City of Industry, Calif.

[21] Appl. No.: 270,795

[22] Filed: Nov. 14, 1988

[51] Int. Cl.⁴ ................................................ G01L 25/00
[52] U.S. Cl. .................................. 73/1 C; 73/862.08
[58] Field of Search ............... 73/1 C, 862.08, 862.26

[56] References Cited

U.S. PATENT DOCUMENTS

| | | | |
|---|---|---|---|
| 2,283,888 | 5/1942 | Zimmerman | 73/862.6 |
| 2,320,023 | 5/1943 | Zimmerman | 73/862.26 |
| 3,364,725 | 1/1968 | 73 | 1 C/ |
| 3,456,486 | 7/1969 | Kross | 73/1 C |

*Primary Examiner*—Charles A. Ruehl
*Attorney, Agent, or Firm*—Georges A. Maxwell

[57] ABSTRACT

A manually engagable, portable and disposable tester for torque limiting and torque indicating screwdrivers comprising a horizontal hand-held plate with top and bottom surfaces, front and rear ends, and opposite sides, an elongate deflection beam with front and rear ends in spaced parallel relationship above the plate, a vertical mounting pin at the front end of the beam engaged in the plate for free rotation and against horizontal and vertical displacement, a driver part with a vertical driving opening to establish rotary driving engagement with a screwdriver and fixed to and projecting rearwardly from the rear end of the beam, a pair of laterally spaced vertical reaction posts projecting up from the plate and in sliding bearing engagement with opposite sides of the beam at the rear end thereof, an elongate horizontal pointer with a rear end fixed to the driver and projecting forward in vertical spaced relationship with the beam and having a front end terminating forward of the beam, and a laterally extending calibrated scale on the top of the plate forward of the beam and below the forward end of the pointer.

12 Claims, 1 Drawing Sheet

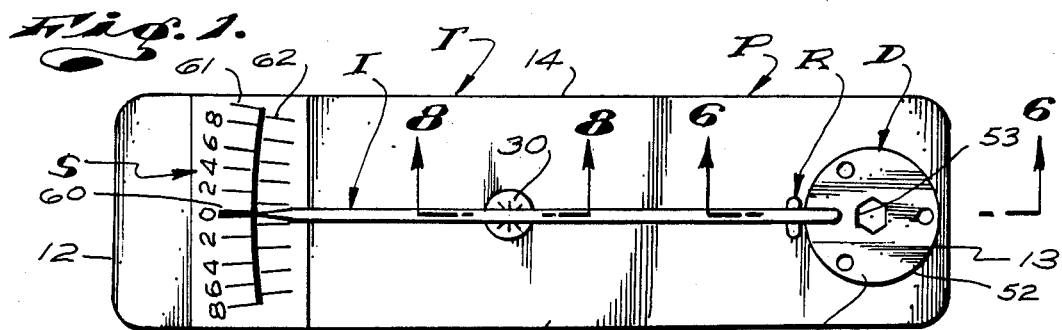
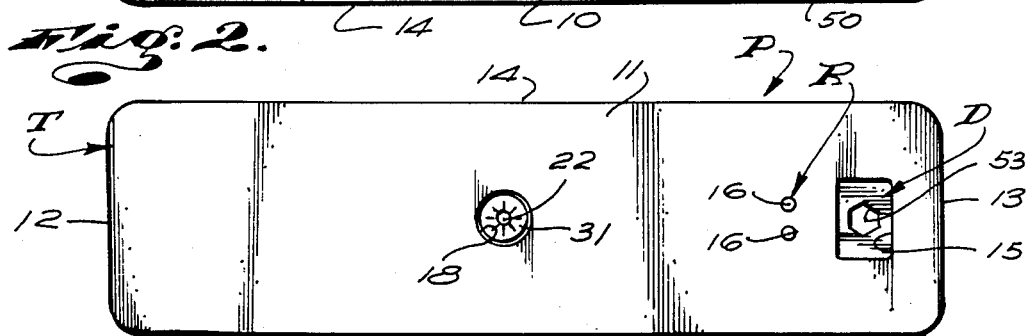
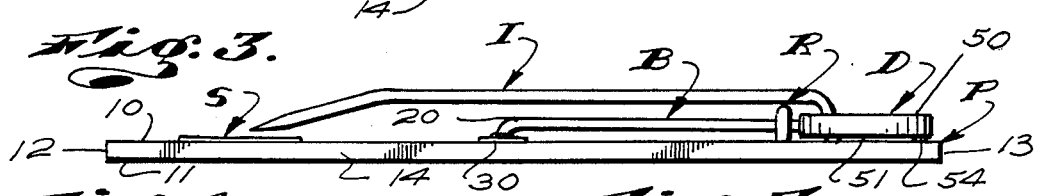
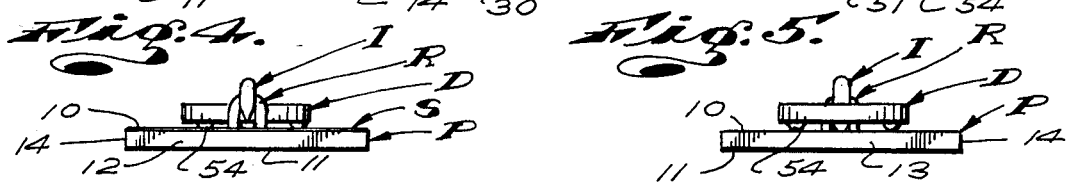
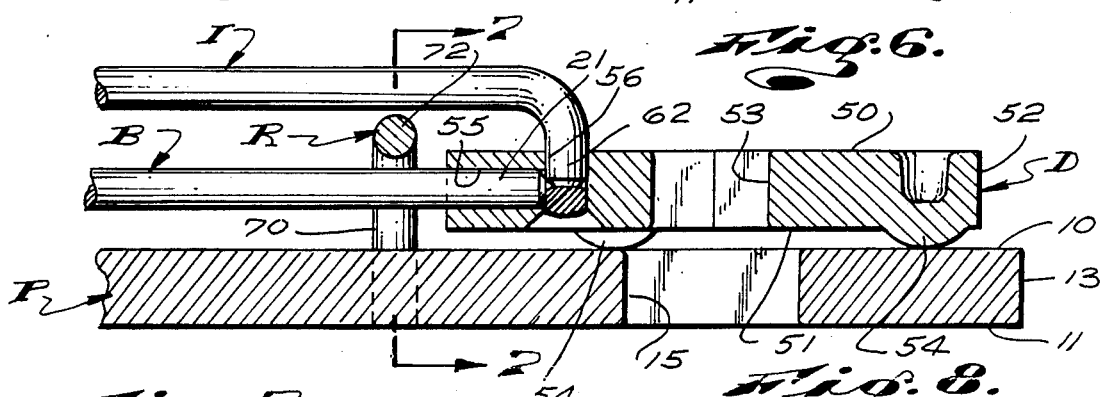
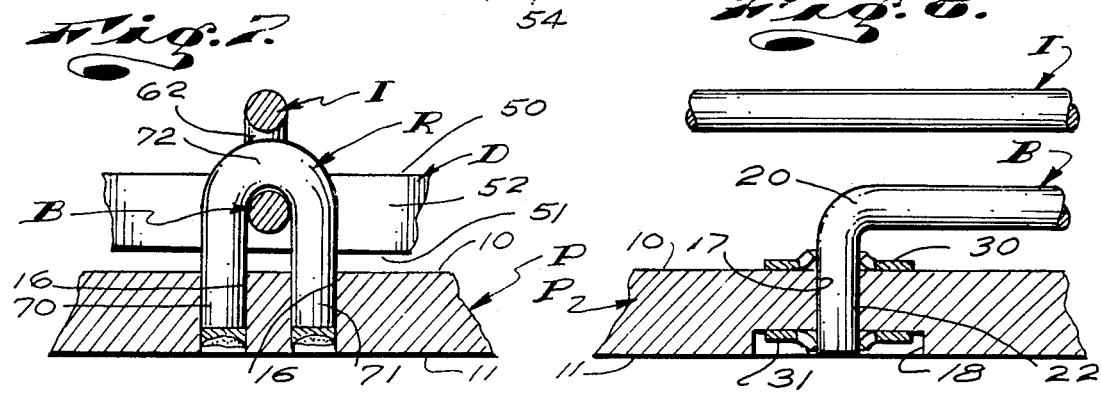

DISPOSABLE TORQUE SCREWDRIVER TESTER

PRIOR ART

Listed below is the most pertinent prior art of which we are aware.

1. U.S. Pat. No. 3,200,632, issued Aug. 17, 1965 to B. Grabovac for Torque Measuring Device. This is a torque tool tester with a deflection beam.
2. U.S. Pat. No. 3,286,564, issued Nov. 22, 1966 to B. Grabovac for Low Torque Meter. This is a torque tool tester with a deflection beam.
3. U.S. Pat. No. 3,364,725, issued Jan. 23, 1968 to B. Grabovac for Torque Wrench Tester. This is a torque tool tester with deflection beam.
4. U.S. Pat. No. 3,726,134, issued Apr. 10, 1973 to B. Grabovac for Dial Torque Wrench. This is a torque wrench with deflection beam.

The prior art of recent in each of the above-identified prior art patents is additional prior art of which we are aware, but each is understood and believed to be no more pertinent than are the specifically identified prior art patents.

BACKGROUND OF THE INVENTION

In the medical art, there is a rapidly and increasing provision and use of implant devices, including artificial or mechanical hearts and certain other organs; monitoring devices such as "heart pacers"; medication supply devices; and, a multitude of different orthopedic devices, such as intermedullary nails, artificial joints and the like.

The majority of implant devices are specially designed devices built of special and oftentimes exotic materials to the highest standards. Further, due to the great responsibility and potential economic liabilities that attach to the design, manufacture and use of such devices, the designers and manufacturers thereof, as a rule, establish very specific and exact specifications with respect to the limitations and capabilities of the devices and with respect to those procedures that must be followed preparatory to their being put to use; when they are in use; and when they are taken out of us.

The physicians and technicians that work with and put such implant devices to their intended uses are confronted with similar and great responsibilities and economic liabilities. Accordingly, it is becoming a well-established rule, that physicians and technicians follow, as closely as possible, the specifications established by the manufacturers of the devices they work with and make and keep exacting records of all that they do in the course of using those devices.

Collateral to the above, in the medical art, for numerous reasons, not the least of which is the potential liability that is attached to the activities of physicians and surgeons, there is an ever-increasing provision and use of "single use" or "disposable" medical and surgical implant tools and/or devices.

It is fast becoming and will soon be common practice that all surgical tools, implements and devices, for each surgical procedure or event, will be supplied and presented to the surgeon and/or a surgical team in sealed, sterile envelopes or packages; used during that procedure and thereafter disposed of.

Today, an extremely large percentage of medical and surgical implements, tools and devices are offered in "single use" or "disposable" form and an ever-increasing number of physicians and surgeons now make specific inquiry as to whether or not specific instruments heretofore available in "multi-use form" are available in "single use" or "disposable" form.

In the above-noted art, the majority of implant devices include or require the use of screw fasteners or similar parts that must be turned or torqued by means of screwdrivers and similar tools. In the course of turning or torquing many of the screw fasteners and the like, it is necessary or prudent that a torque-limiting or torque-indicating type of screwdriver tool be employed and that the torque to which the fasteners or fastener-like parts are subjected be limited and that the torque applied be noted and made record of. As a result of the above, torque screwdrivers such as ratchet or click-type torque-limiting screwdrivers and dial-type torque-indicating screwdrivers are becoming standard surgical instruments. Further, for various practical reasons, it is necessary that those torque-limiting screwdrivers that are used by such that they can be easily, quickly and accurately tested and, if necessary, be adjusted in the course of the surgical procedures in which they are used.

In accordance with the above-noted use and demand for "single use" medical instruments, tools and devices, at least one manufacturer or torque tools, Consolidated Devices, Inc. in the city of Industry, California, now produces and sells a "single use" disposable torque-limiting screwdriver. That screwdriver is such that it can, with the use of a suitable torque tool tester, be tested for accuracy and can be easily and quickly adjusted to operate under any desired magnitude of force, within a rather broad range of operating forces.

The existence of a "single use" disposable torque screwdriver for surgical use, such as is referred to above, has given rise to the want and need of a "single use" or disposable torque tool or torque screwdriver tester that is suitable for both testing and for adjusting those screwdrivers during those surgical procedures in which they are used.

OBJECTS AND FEATURES OF THE INVENTION

It is an object of this invention to provide a small, compact, easy and convenient-to-use and highly accurate torque-limiting screwdriver tester that is sufficiently small and inexpensive to make so that it can be advantageously sterily packaged and supplied for "single use" in a medical or surgical environment and for use in conjunction with a "single use" disposable torque screwdriver.

It is an object and feature of my invention to provide a novel torque screwdriver tester of the general character referred to above that embodies a novel combination and relationship of parts that enables the tester to be made sufficiently small and compact so that it can be easily and conveniently hand-held when in use; can be easily and conveniently sterily packaged; can be easily and conveniently stored and handled together with other sterily packaged single use surgical instruments and the like preparatory to its being put to use.

Another object and feature of the invention is to provide a torque screwdriver tester of the general character referred to above that includes an elongate deflection beam with a front end supported for free rotation about a turning axis that is normal to the longitudinal axis of the beam, a rear end that extends between and is pivotally slidably engaged with a pair of fixed reaction posts, a driver part at and projecting rearwardly from the rear end of the beam, an elongate pointer with a rear end fixed to the driver part and a front end terminating forward of the front end of the beam and directed to a calibrated scale positioned forward of the beam.

The foregoing and other objects and features of the invention will be fully understood from the following detailed description of one preferred form and embodiment of the invention, throughout which description reference is made to the accompanying drawings.

DESCRIPTION OF THE DRAWINGS

FIG. 1 is a top view of the invention;
FIG. 2 is a bottom view;
FIG. 3 is a side view;
FIG. 4 is a view of one end;
FIG. 5 is a view of the other end;
FIG. 6 is an enlarged detailed sectional view taken substantially as indicated by line 5-5 on FIG. 1;
FIG. 7 is a view taken as indicated by line 7-7 on FIG. 6; and,
FIG. 8 is an enlarged sectional view taken as indicated by line 8-8 on FIG. 1.

DETAILED DESCRIPTION OF THE INVENTION

FIGS. 1, 2, 3, 4 and 5 of the drawings are top, bottom, side and end views of a torque screwdriver tester T embodying the present invention.

The tester T includes a rectangular body or plate P which is shown and will be described as being flat and horizontally disposed and as having a central longitudinal axis, flat top and bottom surfaces 10 and 11, longitudinally-spaced oppositely-disposed and transversely-extending front and rear ends or edges 12 and 13 and laterally-spaced oppositely-disposed and longitudinally-extending sides or side edges 14. The plate P is formed of sheet metal that is, for example, 0.039 inches thick. In the reduction to practice of the invention, the plate is 5.5 inches long and 1.5 inches wide. The four corners of the plate are preferably radiused, as shown.

The plate P is formed with a vertical through opening or window 15 in its rear end portion. The window 15 is preferably rectangular and measures 0.50 inches in longitudinal extent and 0.350 inches in lateral extent, relative to the central longitudinal axis of the plate. The opening or window 15 is positioned on the longitudinal axis of the plate mid-way between the sides 14 thereof and about 0.50 inches from the rear end 13 thereof. The plate is next formed with a pair of laterally-spaced, vertical post-receiving openings 16 in its rear end portion, immediately forward of the window 15 therein. The openings are, for example, 0.062 inches in diameter, and are spaced forward of the window 15 about 0.50 inches. The openings 16 are spaced laterally from each other about 0.128 inches and are spaced equal distances from opposite sides of the central longitudinal axis of the plate. Next, the plate has a central vertical pin-receiving opening 17 in its central portion. The opening 17 is on the central longitudinal axis of the plate, is about 0.062 inches in diameter and is spaced 2.06 inches forward from the openings 16. Finally, the bottom surface 11 of the plate is shown formed with a large countersink 18 with a flat downwardly-disposed bottom surface and that is concentric with the opening 17, to accommodate a fastener or retainer part which will hereinafter be described.

In light of the above, it will be apparent that the plate P is of extremely simple design and is a part that is extremely easy and economical to make.

The tester T next includes an elongate horizontal deflection beam B with front and rear ends 20 and 21. The beam B has a short vertical mounting pin 22 depending from its front end 20. The beam B and its pin 22 is preferably established of 0.026 inch diameter piano wire and is 2.29 inches long. The pin 22 is a bent or downwardly-turned extension at the front end of the beam and is 0.135 inches long.

In light of the above, it will be apparent that the beam B, with its mounting pin 22, is a part of very simple design and is such that it can be easily and economically produced.

The beam B is positioned in vertical spaced parallel relationship above the top surface 10 of the plate P, above the central longitudinal axis of the plate and with its rear end 21 terminating immediately forward of the window 15 in the plate. Its forward end 20 terminates above the opening 17 in the plate. The lower end portion of the vertical pin 22 at the front end of the beam depends into and through the opening 17 in rotary sliding engagement therewith.

The pin 22 is retained in engagement in and through the opening 17 in the plate P by vertically-spaced upper and lower retaining washers 30 and 31 that are forcibly engaged on and project radially from the pin and occur in flat sliding bearing engagement on and with the upper surface 10 of the plate and the flat bottom of the countersink 18 in the plate, as clearly shown in the drawings. The retaining washers are flat, horizontal, spring steel washers with pluralities of circumferentially-spaced, radially inwardly-projecting resilient fingers that are biased by and establish secure gripping engagement with the pin when the pin is forcibly engaged through them. The retaining washers 30 and 31 are extremely inexpensive, standard fastener parts.

The tester T next includes a driver D secured to the rear end of the beam B and which is engagable with a fastener-engaging head of a related torque screwdriver (not shown) and which carries an elongate pointer I that will be described in the following.

The driver D is preferably a flat, horizontally-disposed, discshaped sheet metal part with flat, horizontal upwardly and downwardly disposed top and bottom surfaces 50 and 51, a radially outwardly disposed exterior edge or surface 52, and a central, vertical, polygonal (hexagonal) tool head-receiving opening 53. The driver D is formed with a plurality (three) of circumferentially-spaced, downwardly-projecting and downwardlydisposed semi-spherical, convex anti-friction bearings or projections 54 that normally establish sliding supporting engagement with the top surface 10 of the plate. The bearings 54 can be and are shown as formed integrally on and with the carrier by a simple dimpling operation.

The driver D next includes a horizontal, forwardly and radially outwardly opening beam-receiving opening 55 entering its outer edge or surface 52 and an upwardly opening vertical stem-receiving opening 56.

The driver D is, for example, a stamper part made of 0.125 inch sheet metal stock and is about 1 inch in diameter. The drive opening 53 in its center is a 0.160 inch hexagonal opening. The beam opening 55 is established by drilling and is 0.062 inches in diameter and about 0.295 inches deep. The pin opening 56 is a 0.062 inch diameter through-opening. In practice, the vertical opening 56 intersects the rear or inner end of the opening 55.

The rear end portion of the beam B is tightly or snugly engaged in the opening 55 and the rear end of the beam is fixed in and with the driver by a weld made within the opening 56 from the open bottom end thereof.

The driver D is carried by the beam at the rear end thereof with the central vertical axis of the opening 53 and the window 15 in the plate P in vertical alignment and so that the opening 53 is freely accessible from below the plate P through the window 15.

It is to be noted that the 0.350 inch by 0.50 inch window 15 is substantially larger than the 0.16 inch drive opening 53 in the driver D and is such that the opening 53 can be moved forwardly, rearwardly and laterally above the window 15 appreciable distances without moving the opening from within the perimeter limits of the window 15.

The tester T next includes the above-referred to pointer I. The pointer I is an elongate, horizontal, longitudinally-extending metal wire part with front and rear ends 60 and 61. The front end portion of the pointer can be and is shown turned downwardly and forwardly and as being formed with a pointed tip. The rear end of the pointer I is formed with a downwardly-turned, depending, vertical mounting pin 62. The pointer is, for example, made of 0.026 inch diameter metal wire stock.

In accordance with the above, it will be apparent that the pointer I is an extremely simple and both easy and economical-to-make part.

The lower end of the pin 62 on the pointer is snugly slidably engaged in the opening 56 in the driver and is fixed thereto by the same weld provided in the opening 56 to fix the rear end of the beam B in and with the driver.

The pointer I extends forwardly from the driver D in vertical spaced parallel relationship above the beam and its forward end portion projects forwardly beyond the forward end of the beam with its forward pointed tip in close spaced relationship above the top surface 10 of the plate P for free lateral movement to the left or to the right of center, when looking forward from the driver D.

The tester T next includes a laterally extending scale S on the top surface 10 of the plate P forward of the beam and below the pointed front tip end of the pointer I. The scale is preferably printed on a decal or similar durable label that is applied to the surface of the plate, in accordance with common practices. The scale S, in accordance with common practice, has a central zero calibration 60 that occurs beneath the pointer I when the pointer is in its normal position and has two series of calibrations 61 and 62 extending laterally from opposite sides of the zero calibration and that indicate the force directed through the tester T when the pointer I of the tester is directed to them. The scale S can be established to indicate the forces directed through the tester T in inch-pounds, foot-pounds or any other suitable and desired units of force.

Next and finally, the tester T includes reaction means R on the plate P and engaging the rear end of the deflection beam B, immediately forward of the driver D. The reaction means R prevents lateral deflection, left or right, of the rear portion of the beam related to it. The reaction means R includes a pair of laterally spaced (left and right-hand) vertical reaction posts 70 and 71 carried by and projecting up from the top surface 10 of the plate P and occurring at right and left-hand sides of the beam B in sliding and pivotal bearing engagement therewith.

The posts 70 and 71 have lower end portions slidably engaged in the openings 16 in the plate and which are fixed against displacement from the plate by welding their lower terminal ends in their related openings 16, as shown.

In the preferred form of the invention and as shown, the upper ends of the posts 70 and 71 are connected together and reinforced against bending and/or displacement by an integral bridge 72 that overlies the beam B. Accordingly, the posts 70 and 71 are defined by the legs of a U-shaped part which, in the example given, is formed of 0.062 inch diameter wire stock.

The U-shaped unit that defines the posts 70 and 71 of the reaction means R is a simple, easy and economical-to-make part, and is easy and convenient to handle and to be engaged in and with the plate P during assembly of the tester.

In the preferred carrying out of the invention, the beam B and the posts 70 and 71 are cylindrical in cross-section and such that upon working and movement of the beam relative to the posts point contact is established and maintained between the beam and the posts whereby minimum drag and/or resistance to relative movement of the related parts is encountered.

When developing the present invention and when working with several prototype structures, reaction means utilizing other than cylindrical posts and that presented flat and other than cylindrical beam engaging reaction surfaces, were employed. The accuracy of those prototype structures were notably adversely affected by the non-cylindrical form of the opposing engaging parts. Accordingly, the cylindrical form of the beamengaging surfaces of the reaction means are, whether defined by posts, as illustrated, or by some equivalent structure, is very important in carrying out the present invention if an acceptably accurate and practical-to-use tester is to be provided.

In light of the foregoing, it will be abundantly clear and apparent that the tester T includes only seven parts, two of which (the washers) are standard parts and the remaining five of which are extremely simple and economical-to-make parts that lend themselves to being mass produced at little cost. It will also be apparent that the parts of the tester T are such that they lend themselves to being easily and quickly assembled by unskilled bench labor.

It is also to be noted that the tester T is free of openings, corners and the like in which foreign matter might collect and is such that it lends itself to being easily and effectively cleaned, sterilized, packaged, stored and handled under those sterile conditions required to be maintained when and if the tester is used in and for medical and surgical uses.

When put to use, the plate P of the tester can be held in one of its user's hands and so that the user can, with his or her other hand, grasp, and direct the polygonal fastener-engaging head of a related torque screwdriver into rotary driving engagement in the central opening of the driver D (in axial alignment with that opening) from the top or bottom of the plate, as desired or as circumstances require. When the screwdriver is engaged in and with the driver D, the user of the tester and screwdriver manually turns the screwdriver left or right (clockwise or counterclockwise) about its longitudinal axis and relative to the tester. Manual turning of the screwdriver yieldingly turns the driver D about its central, vertical axis. Turning of the driver D about its central, vertical axis is yieldingly limited by the rear end of the beam that bears against and is stopped by the reaction posts 70 and 71 of the reaction means R. The length of the portion of the deflection beam extending from the point of contact of the beam with the reaction means R, to the driver D, is extremely short and is insufficient to result in appreciable deflection or bending of that portion of the beam. The above-noted rear portion of the beam and the driver D cooperate to define a lever arm extending form the reaction means R to the central, vertical axis of the driver D and which is integrally joined with the remainder or working portion of the deflection beam B that extends forwardly from the reaction means R to the forward, vertical mounting pin 22. As a result of the above relationship of parts (and portions) of the tester, when the screwdriver and driver D are manually turned about the central vertical axis of the driver D and turning of the driver D about that axis is stopped by the rear end of the beam B by the reaction means R, that turning motion of the driver and of the rear portion of the deflection beam urges and/or moves the driver laterally relative to the reaction means, counter to the direction of applied turning forces. That lateral movement or displacement and limited turning of the driver D results in lateral angular displacement of the rear end portion of the beam and corresponding opposite, lateral deflection of the portion of the beam B immediately forward of the reaction means. The above-noted lateral deflection of the portion of the beam B immediately forward of the reaction means R results in yielding bending and lateral deflection of the beam between the reaction means R and the mounting pin 22 at the front end of the beam. The noted lateral deflection or bending of the beam results in slight forward shifting of the rear end portion of the beam relative to the reaction means. Such shifting of the beam is predeterminable and easily compensated for so that it does not bring about any adverse effects. The extent or degree of lateral deflection of the beam between the mounting pin 21 and the reaction means R and the degree of lateral movement and turning of the driver D relative to and about the longitudinal axis of the plate and the vertical axis of the driver opening is proportional to the magnitude of the turning forces delivered into and through the driver D by the screwdriver engaged therewith.

When the driver D is yieldingly turned about its central, vertical axis and is yieldingly displaced laterally, the pointer I that is carried by and which projects freely forwardly from the driver to the force-indicating scale S on the top of the plate P at the forward end portion thereof, turns and moves with the driver D and its forward end swings laterally, left or right, from its normal central position, above the scale S. Lateral movement of the forward end of the pointer I relative to the scale S is proportional to the magnitude of the turning forces applied to the driver D by the screwdriver engaged therewith. The calibrations of the scale are such that the calibration to which the pointer is directed indicates the magnitude of the force applied into and through the tester.

At this time, it is extremely important to note that when the portion of the deflection beam B occurring between the mounting pin 22 and the reaction means R is deflected laterally, as noted above, the pin 22, that anchors or connects the forward end of the beam to the plate, turns freely about its vertical axis and relative to the plate. It is not fixed to the plate in a manner that might require that the pin 22 be torsionally deflected. Accordingly, only the portion of the beam that extends between the pin 22 and the reaction means R is yieldingly deflected. It is the above-noted free turning of the mounting pin 22 relative to the plate P that enables the tester here provided to be made small, light and compact.

When developing the tester T, prototype tester were built and tested wherein the mounting pins for the beam B were fixed to the plate and were torsionally biased when those prototype testers were operated. It was found that in those prototype structures a great portion (about 50%) of the deflection that occurred was concentrated at and throughout the mounting pins and that those pins were torsionally overstressed and broken. To overcome and/or compensate for the above-noted overstressing and breaking of the mounting pin for the beams, the beams and the pins would have to be made at least two times greater in diameter and the effective longitudinal extent of the beams would have to at least be doubled to make an effective and serviceable tester that is operable within the range of forces that the present tester T operates.

In accordance with the above, by making the mounting pin 22 for the beam B in the tester T rotatable in and relative to the plate P, the tester T can be and is made less than one-half the size of a tester that is similar in all respects, except that its mounting pin is fixed to the plate. Accordingly, making the pin 22 rotatable in and relative to the plate P is an important, novel feature of the present invention.

With the new, small, hand-held tester T provided by the present invention, the operating force of related torque-limiting screwdrivers can be checked and/or adjusted at the site where the screwdrivers are used.

The tester T that we provide is a small and inexpensive-to-make and handle structure that can be advantageously provided for single use and subsequent disposal.

While we have described our present tester as being intended to test torque screwdrivers, it will be quite apparent that in practice the tester can be used to test and/or to adjust various other torque-limiting and/or torque-indicating tools and devices and might, under certain special circumstances, be utilized to directly ascertain the torsional forces directed onto and through various fasteners and parts of machines and/or apparatus.

Having described only one typical preferred form and embodiment of our invention, we do not wish to be limited to the specific details herein set forth but wish to reserve to ourselves any modifications and/or variations that might appear to those skilled in the art and which fall within the scope of the following claims.

Having described my invention, we claim:

1. A hand-held torque tester for hand-held torque-limiting tools comprising an elongate horizontal plate with a central longitudinal axis, top and bottom surfaces, front and rear ends and opposite sides, an elongate horizontal longitudinally-extending deflection beam with front and rear ends in spaced relationship above the top surface and parallel with the longitudinal axis of the plate, a vertical mounting pin depending from the front end of the beam and into the plate for free relative rotation therein and against vertical and horizontal displacement relative thereto, a driver part fixed to and projecting rearwardly from the rear end of the beam and having a central vertical drive opening to receive and establish rotary driving engagement with a part of a tool to be tested, reaction means carried by the plate and defining laterally-spaced oppositely-disposed reaction surfaces at opposite sides of the beam adjacent the rear end thereof, an elongate horizontal pointer with front and rear ends normally in spaced parallel relationship with the beam and having its rear end fixed to the driver and a front end portion projecting forwardly and toward the top surface of the plate forward of the beam, and a force-indicating scale on and extending laterally of the plate below the front end of the pointer.

2. The tester set forth in claim 1 wherein the beam is established of round-in-cross-section metal wire stock and the reaction surfaces at the opposite sides of the beam extend vertically and are radiused to establish point contact with adjacent opposing sides of the beam.

3. The tester set forth in claim 1 wherein the beam is established of round-in-cross-section metal wire stock and the reaction surfaces at the opposite sides of the beam extend vertically and are radiused to establish point contact with adjacent opposing sides of the beam; the reaction surfaces are defined by the inner opposing sides of laterally-spaced vertical legs of an inverted U-shaped reaction part made of round-in-cross-section wire stock, the legs have lower ends fixed to the plate.

4. The tester set forth in claim 1 wherein the driver is a flat horizontal part that is in vertical spaced relationship above the rear portion of the plate and the driver opening therein is a polygonal vertical throughopening and opens upwardly and downwardly, the plate has an upwardly and downwardly window opening positioned below the driver and through which a tool to be tested can be moved upwardly to engage the driver.

5. The tester set forth in claim 1 wherein the driver is a flat horizontal part that is in vertical spaced relationship above the rear portion of the plate and the driver opening therein is a polygonal vertical throughopening and opens upwardly and downwardly, the plate has an upwardly and downwardly window opening positioned below the driver and through which a tool to be tested can be moved upwardly to engage the driver; the beam is established of round-in-cross-section metal wire stock and the reaction surfaces at the opposite sides of the beam extend vertically and are radiused to establish point contact with adjacent opposing sides of the beam.

6. The tester set forth in claim 1 wherein the driver is a flat horizontal part that is in vertical spaced relationship above the rear portion of the plate and the driver opening therein is a polygonal vertical throughopening and opens upwardly and downwardly, the plate has an upwardly and downwardly window opening positioned below the driver and through which a tool to be tested can be moved upwardly to engage the driver; the beam is established of round-in-cross-section metal wire stock and the reaction surfaces at the opposite sides of the beam extend vertically and are radiused to establish point contact with adjacent opposing sides of the beam; the reaction surfaces are defined by the inner opposing sides of laterally-spaced vertical legs of an inverted U-shaped reaction part made of round-in-crosssection wire stock, the legs have lower ends fixed to the plate.

7. The tester set forth in claim 1 wherein the mounting pin is a vertical cylindrical part slidably entered into and extending through a vertical opening in the plate, vertically spaced upper and lower retainer washers are engaged on the pin and occur above and below the plate and in rotary sliding retaining engagement therewith.

8. The tester set forth in claim 1 wherein the mounting pin is a vertical cylindrical part slidably entered into and extending through a vertical opening in the plate, vertically spaced upper and lower retainer washers are engaged on the pin and occur above and below the plate and in rotary sliding retaining engagement therewith; the beam is established of round-in-crosssection metal wire stock and the reaction surfaces at the opposite sides of the beam extend vertically and are radiused to establish point contact with adjacent opposing sides of the beam.

9. The tester set forth in claim 1 wherein the mounting pin is a vertical cylindrical part slidably entered into and extending through a vertical opening in the plate, vertically spaced upper and lower retainer washers are engaged on the pin and occur above and below the plate and in rotary sliding retaining engagement therewith; the beam is established of round-in-crosssection metal wire stock and the reaction surfaces at the opposite sides of the beam extend vertically and are radiused to establish point contact with adjacent opposing sides of the beam; the reaction surfaces are defined by the inner opposing sides of laterally-spaced vertical legs of an inverted U-shaped reaction part made of round-in-cross-section wire stock, the legs have lower ends fixed to the plate.

10. The tester set forth in claim 1 wherein the mounting pin is a vertical cylindrical part slidably entered into and extending through a vertical opening in the plate, vertically spaced upper and lower retaining washers are engaged on the pin and occur above and below the plate and in rotary sliding retaining engagement therewith; the driver is a flat horizontal part that is in vertical spaced relationship above the rear portion of the plate and the driver opening therein is a polygonal vertical through-opening and opens upwardly and downwardly, the plate has an upwardly and downwardly window opening positioned below the driver and through which a tool to be tested can be moved upwardly to engage the driver.

11. The tester set forth in claim 1 wherein the mounting pin is a vertical cylindrical part slidably entered into and extending through a vertical opening in the plate, vertically spaced upper and lower retainer washers are engaged on the pin and occur above and below the plate and in rotary sliding retaining engagement therewith; the beam is established of round-in-crosssection metal wire stock and the reaction surfaces at the opposite sides of the beam extend vertically and are radiused to establish point contact with adjacent opposing sides of the beam.

12. The tester set forth in claim 1 wherein the mounting pin is a vertical cylindrical part slidably entered into and extending through a vertical opening in the plate, vertically spaced upper and lower retainer washers are engaged on the pin and occur above and below the plate and in rotary sliding retaining engagement therewith; the beam is established of round-in-crosssection metal wire stock and the reaction surfaces at the opposite sides of the beam extend vertically and are radiused to establish point contact with adjacent opposing sides of the beam; the reaction surfaces are defined by the inner opposing sides of laterally-spaced vertical legs of an inverted U-shaped reaction part made of round-in-cross-section wire stock, the legs have lower ends fixed to the plate.

* * * * *